United States Patent [19]
Giger

[11] Patent Number: 5,515,380
[45] Date of Patent: May 7, 1996

[54] REDUCING ERRORS IN DIGITAL COMMUNICATION

[75] Inventor: Adolf J. Giger, Boxford, Mass.

[73] Assignee: Advanced Techcom, Inc., Lawrence, Mass.

[21] Appl. No.: 411,550

[22] Filed: Mar. 28, 1995

Related U.S. Application Data

[63] Continuation of Ser. No. 149,291, Nov. 9, 1993, abandoned.

[51] Int. Cl.⁶ ................................... G06F 11/16
[52] U.S. Cl. ............................................ 371/20.1
[58] Field of Search ............................ 370/16; 371/8.2, 371/11.2, 49.1; 395/200

[56] References Cited

U.S. PATENT DOCUMENTS

| | | | |
|---|---|---|---|
| 3,253,259 | 5/1966 | Jacoby | 371/11.2 |
| 3,451,042 | 6/1969 | Jensen et al. | 371/8.2 |
| 3,457,373 | 7/1969 | Van Duuren et al. | 370/16 |
| 3,476,922 | 11/1969 | Yiotis | 371/8.2 |
| 3,519,750 | 7/1970 | Beresin et al. | 370/16 |
| 3,526,837 | 9/1970 | Zegers et al. | 371/8.2 X |
| 3,648,256 | 3/1972 | Paine et al. | 395/200 |
| 4,605,921 | 8/1986 | Riddle et al. | 371/37.2 |
| 4,627,045 | 12/1986 | Olson et al. | 370/16 |
| 4,885,739 | 12/1989 | Read et al. | 370/58.1 |
| 5,331,642 | 7/1994 | Valley et al. | 371/8.2 X |

Primary Examiner—Edward R. Cosimano
Attorney, Agent, or Firm—Fish & Richardson

[57] ABSTRACT

Errors in communication of a bit stream of information are reduced by incorporating an error checking facility (e.g., parity checking bits) in the information, sending the information on two independent communication channels, and selecting the information sent on one or the other of the two channels based on an error checking analysis of the information sent on both of the channels.

20 Claims, 5 Drawing Sheets

REDUCING ERRORS IN DIGITAL COMMUNICATION

This is a continuation of application Ser. No. 08/149,291, filed Nov. 9, 1993, now abandoned.

BACKGROUND OF THE INVENTION

This invention relates to reducing errors in digital communication.

When a bit stream is sent from a transmitter to a receiver through a channel, bit errors may occur. Typical international standards applied to a high quality, 20 km long channel allow only one severely errored second (SES) per month during which the bit-error ratio (BER) is higher than $10^{-3}$ (1 bit error per 1000 bits).

When the equipment in the channel breaks, all of the communicated bits may be lost for an extended period of time. Failures of this kind are often handled by providing duplicate hot standby equipment that can be switched into service after the failure has been detected. Such hot standby switching normally is associated with a short period of high bit errors.

Even in the absence of such major failures, communication channels by their nature typically cause occasional isolated errors or error bursts in the bit stream being carried. In radio relay systems multipath fading can be a frequent source of such errors. Complex error detection and correction schemes are often used on a digital channel to detect and correct these occasional errors.

SUMMARY OF THE INVENTION

In general, in one aspect, the invention features a method for reducing errors in communication of a stream of information bits by incorporating an error checking facility (e.g., parity checking bits) in the information, sending the information on two independent communication channels, and selecting the information sent on one or the other of the two channels based on an error checking analysis of the information sent on both of the channels.

Some implementations of the invention include the following features. The step of selecting comprises determining a relative degree of error exhibited in the information sent on the two channels. For example, the information sent on one of the channels which is not in error may be selected. More generally, an average error rate over time is determined for each of the channels and the channel with the lower average error rate is selected. The information is organized in consecutive blocks of bits and error detecting information is incorporated in each of the blocks. A selection is made of one or the other block based on an error checking analysis of the blocks. Where the two channels impose different delays on the communication of the information the method may include compensating for the different delays prior to the selecting step. Selection of the block with the fewer errors can be made without incurring additional switching errors. Error correction is thus achieved through a process of errorless switching.

Among the advantages of the invention are the following.

Duplicate channel equipment already used to accommodate equipment failures may also be used to deal with occasional bit errors and the errors caused by multipath fading. Switching may be performed extremely quickly (on the order of nanoseconds rather than milliseconds), and in an errorless fashion, which is especially useful on radio hops that require a high rate of switching due to fading. Complex error coding systems to achieve a full error correction capability at the receiver may no longer be needed. The parity encoding may be done at high speed. The amount of redundant information that must be carried on each channel is reduced. The invention may be implemented in relatively simple, inexpensive circuitry.

Other advantages and features of the invention will become apparent from the following description and from the claims.

DESCRIPTION

Figure 1:
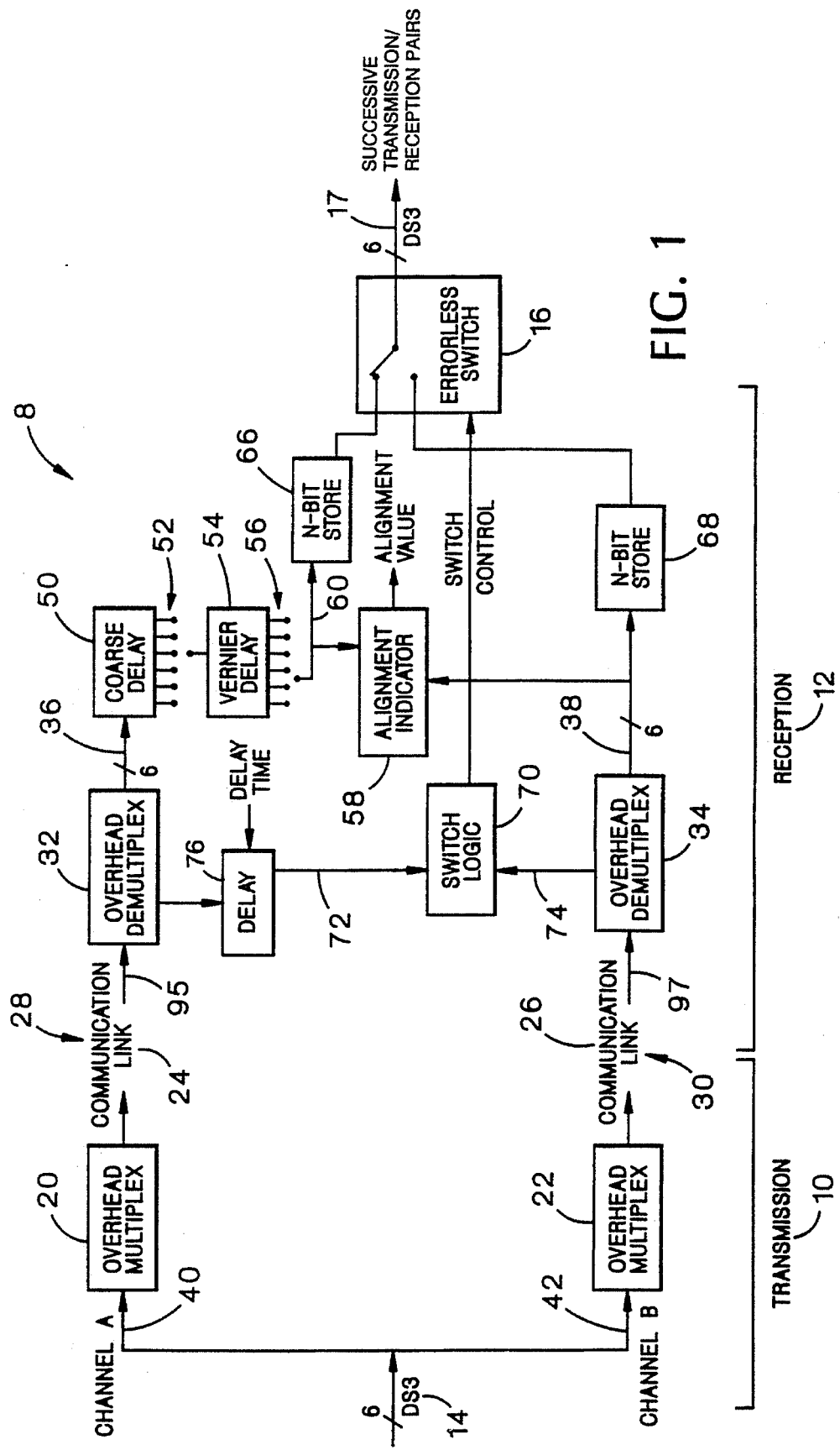
FIG. 1 is a block diagram of an error-correction and errorless switching communication system.
Figure 7:
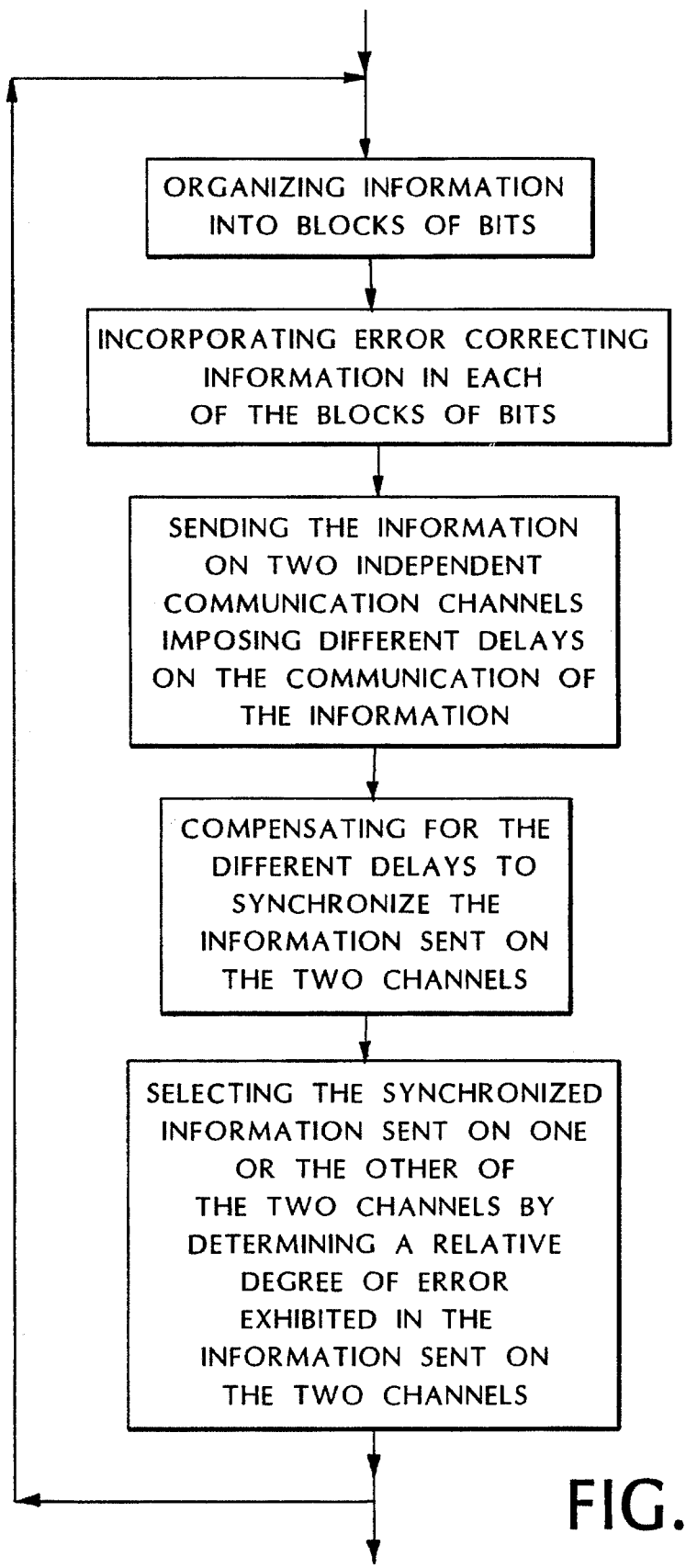
FIG. 7 is a flow diagram.

In FIG. 1, and referring also to FIG. 7, in an error correcting and errorless switching communication system 8, transmission 10 and reception 12 of a DS3 digital signal 14 (appearing at a bit rate of, e.g., 45 Mb/sec) is achieved by simultaneous communication (e.g., radio communication) via a pair of communication channels A and B followed by selection of the output of one or the other of the channels by an errorless switch 16. The DS3 output of the errorless switch may then be delivered to successive transmission/reception pairs (like the one shown in FIG. 1) to achieve multiple hop communication.

Each channel A and B includes an overhead multiplexer circuit 20, 22. Each of the overhead multiplexer circuits, among other things, adds a fast parity bit (FPAR) for each n (e.g., 20) information bits appearing in the digital signal 14. The output of each overhead multiplexer circuit is then sent via a physical communication link 24, 26 (e.g., the atmosphere, wire, or optical fiber) where it may be subjected to noise and interference 28, 30 (e.g. multipath fading). At the other end of the physical links, each channel has an overhead demultiplexer 32, 34, which, among other things, checks the parity of each block of bits and then resets the parity bit.

If either of the channels has deteriorated due to equipment or cable problems or because of radio fading or if occasional bit errors are experienced as a result of processes on the physical communication link, this will be indicated by the parity errors. Because the two channels are physically independent (e.g., use separate equipment and separate cables or, in the case of radio, use space, angle or frequency diversity) it is unlikely that both channels will simultaneously experience bit errors (as explained in the following paragraph). By choosing the better of the two signals carried on the two channels transmission quality is improved. This is especially valuable if one of the channels has serious transmission problems (high bit error ratio, long error bursts) or transmission has ceased altogether.

In order to analyze the improvement in BER achieved by the proposed errorless switching scheme, we assume that errors on a channel can always be completely eliminated if the other channel has no errors in the block in question. If corresponding blocks on the two channels have errors simultaneously, then no switching takes place and the errors remain unchanged in those particular blocks. This worst case analysis yields the following results: the new BER (after switching) on channel 1 is found to be $$BER_1 = p_1 P(x_2 > 0) \quad (1)$$

where $p_1$ is the average BER on the first channel and $p(x_2>0)$ is the probability of having any number of bit errors (from 1 to n) in a block of n bits on the second channel.

$p(x_2>0)$ can be found from the binomial distribution $p(x_2)$, which gives the probability of having exactly $x_2$ bits in error in a block of n bits:

$$p(x_2) = \frac{n!}{x_2!(n-x_2)!} p_2^{x_2}(1-p_2)^{n-x_2} \quad (2)$$

The probability of having any number of bit errors is $$p(x_2>0) = 1 - p(x_2=0) = 1 - (1-p_2)^n \approx n p_2 \quad (3)$$

where the approximation holds for $p_2$ close to zero. Similarly, the new BER, after switching, on the second channel is found to be $$BER_2 = P_2 P(x_1 > 0) \approx n p_1 p_2 \quad (4)$$

where the approximation holds for $p_1$ close to zero. For low channel bit error probabilities $p_1$, $P_2'$ and short blocks, the bit error ratios on the switched channels $BER_1$ and $BER_2$ will be low, as illustrated in the table below, for n=20.

| $P_1$ | $P_2$ | $BER_1$ or $BER_2$ |
|---|---|---|
| 0 | $0 \leq p_2 \leq 1$ | 0 |
| $0 \leq p_1 \leq 1$ | 0 | 0 |
| 1 | 1 | 1 |
| 0.5 | 0.5 | 0.5 |
| 0.1 | 0.1 | 0.088 |
| 0.01 | 0.01 | $1.82 \; 10^{-3}$ |
| $10^{-3}$ | $10^{-3}$ | $1.98 \; 10^{-5}$ |
| $10^{-6}$ | $10^{-6}$ | $2 \; 10^{-11}$ |
| $10^{-8}$ | $10^{-8}$ | $2 \; 10^{-15}$ |

If the switch itself is errorless, and the error probability on one or both channels is low, it is apparent that the system of FIG. 1 will correct almost all isolated bit errors and error bursts in the channel output stream.

The system also handles large-scale equipment failures, and very long bursts of errors in one channel, if the other channel is error-free or has a low error rate during that period.

To achieve the desired errorless switching, the timing or phases of the two data streams 36, 38 must be aligned to within a small fraction of the (binary) bit period T. The alignment process has been sometimes called differential absolute delay equalization or DADE. The original perfect alignment of the two data streams 40, 42 may have been lost because of different physical lengths of the channels (which can be quite large in a ring transmission system and is typically smaller for radio communication); ring systems include ring connected optical fiber links having two cables which support signals in opposite directions. In radio systems, path length delays may result in a time misalignment of a few hundred nanoseconds, which is about ten bits of a DS3 (45 Mb/s) signal.

If we assume for the moment that channel A is shorter than channel B, then the first stage of the alignment process is achieved by a coarse delay shift register 50 having output taps 52 spaced at intervals of T. The output of the coarse delay is delivered to a vernier delay circuit 54, whose output taps 56 are spaced at intervals of 0.1 T or less. The process of selecting the taps of the coarse and vernier delays may be performed automatically or manually based on an alignment indicator 58 (e.g., an exclusive OR circuit) which indicates when the realigned data stream 60 is aligned with the data stream 38 on channel B.

The switching of errorless switch 16 cannot occur until the parity checking is completed for each block of bits. It is necessary to store the n bits of each block on each of the channels temporarily in an n-bit store (e.g., a shift register) 66, 68 so that when the parity checking process is completed, the chosen block of bits (channel A or channel B) is available for delivery through the errorless switch.

The choice of which block (channel A or channel B) is to be passed through the errorless switch is made by switch logic 70 based on error information 72, 74 sent from the two demultiplexers based on their error checking. A delay 76 assures that the error information from the two demultiplexers arrives at the switch logic at the same time. If neither of the channels is error free, the switch logic determines which of the two channels had fewer errors, averaged over a short period of time, and causes the switch to use the block from that channel. The switching time is extremely fast (a fraction of the bit period T) and can take place once every n bits. The parity decoders and the switch logic process the channel output stream almost instantaneously, so that switching occurs immediately after the block of n bits has arrived. For example, for a block of 20 bits at 45 Mb/s, error detection and switching may occur in one half a microsecond. If a channel remains errorless, no switching occurs.

Figure 2:
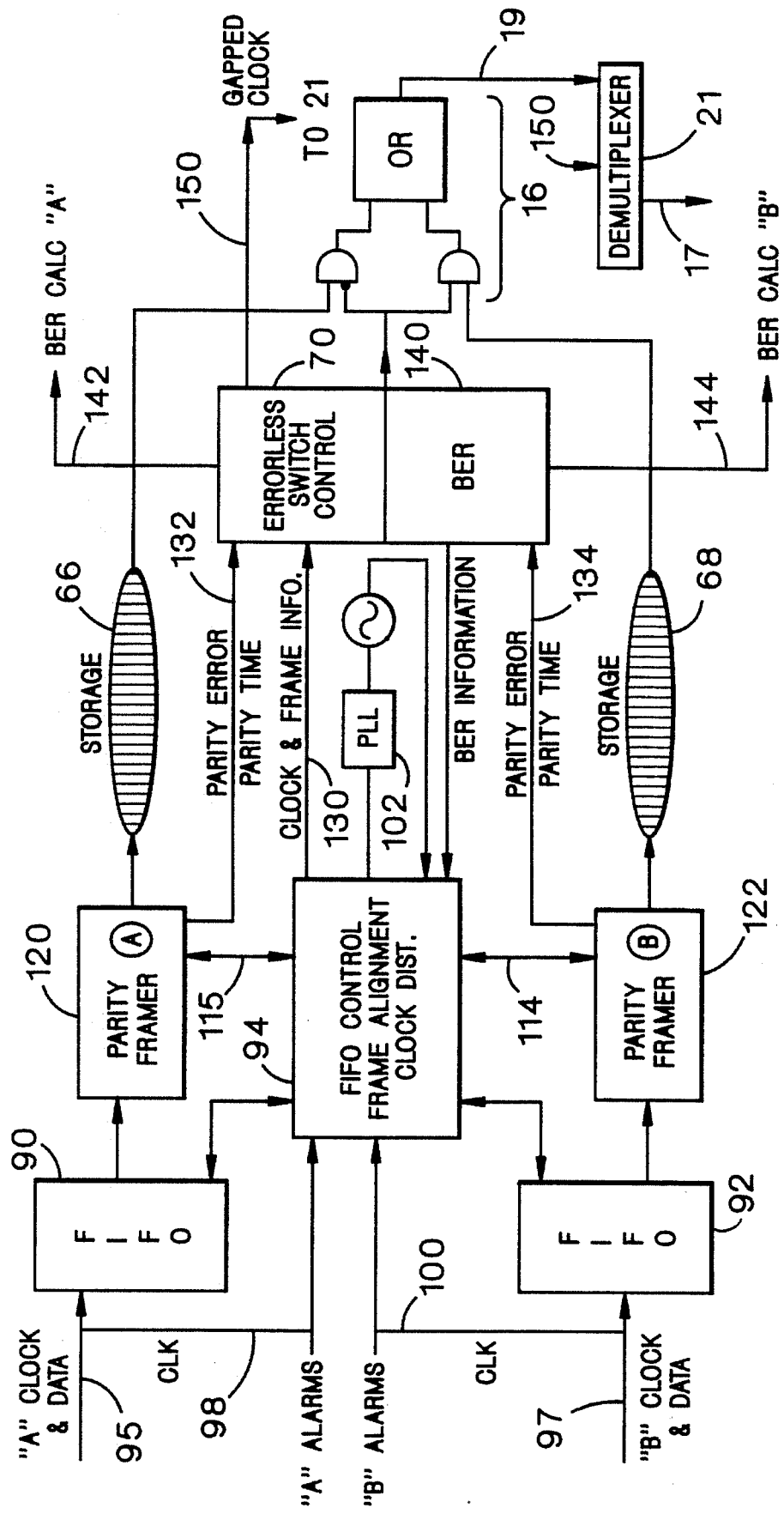
FIG. 2 is a block diagram of a portion of the communication system.

The fast parity bits are inserted in a specific frame of m parity blocks. In an example of an implementation of the reception side of the invention (see FIG. 2), the channel A and channel B binary bitstreams 95, 97 (including the fast parity bits) received from the digital demodulator-regenerator in the receiver are loaded serially into separate dual port RAMs (FIFOs) 90, 92 for temporary storage and realignment. Although the figure suggests that the data streams are carried serially, parallel rails may be used in multilevel modulation schemes like mFSK or mQAM, common in radio, and in communication systems where the bit rate is high.

The dual port RAMs may have 64 bits and thus be adequately large to allow them to serve as time buffers to permit realignment of the two data streams. The blocks are read out of the two RAMs at precise times to accomplish the realignment.

Figure 3:
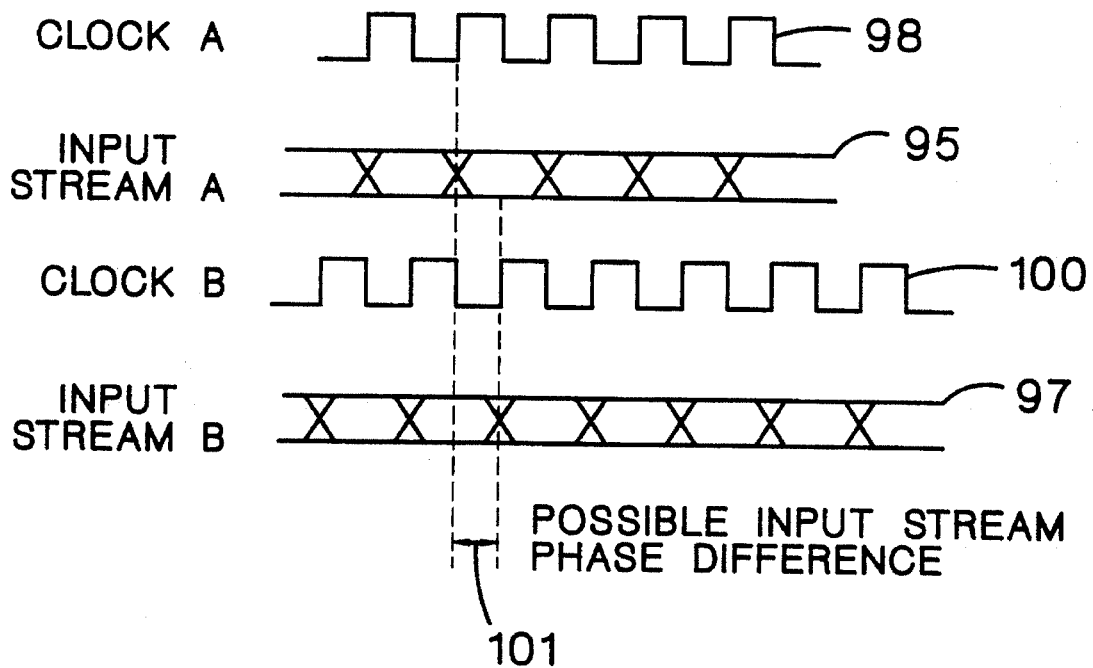
FIG. 3 is a timing diagram.
Figure 4:
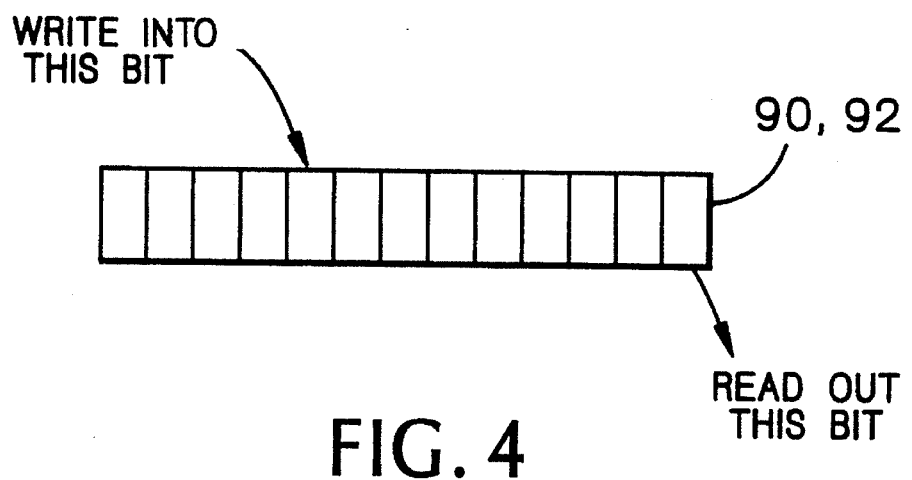
FIG. 4 is an illustration of first-in first-out buffer operation.
Figure 5:
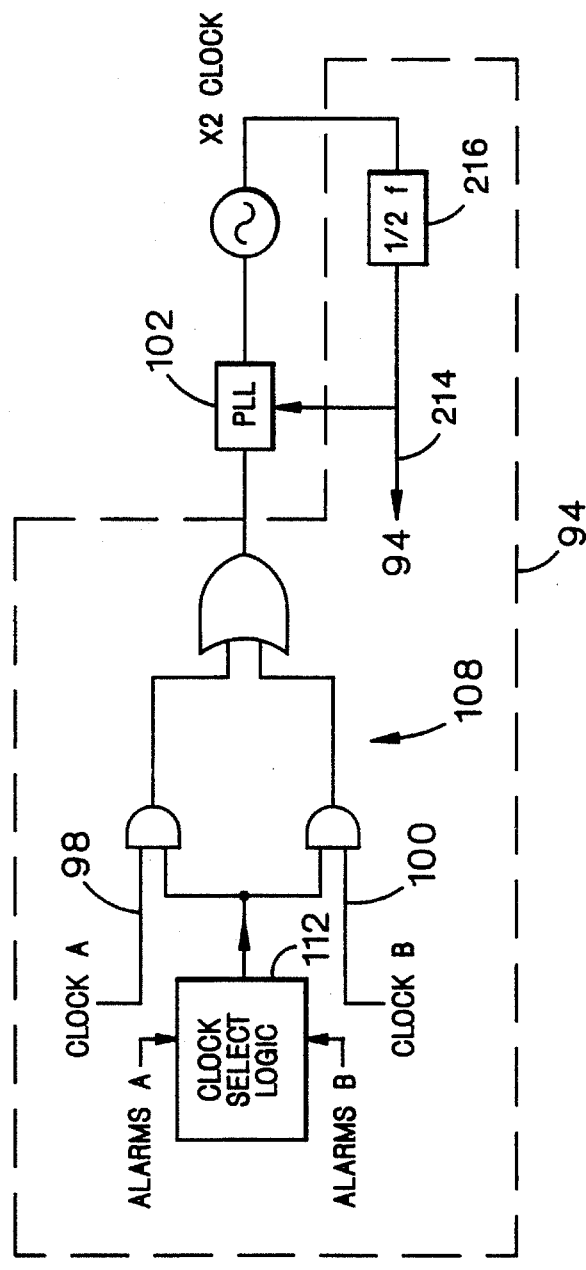
FIG. 5 is a block diagram of clock selection and PLL circuitry.

The alignment process is controlled by a FIFO control unit 94. As shown in FIG. 3, clocks A and B 98, 100 are each synchronized with input bitstreams A and B 95, 97, respectively. The input bitstreams may have a phase difference 101. A new clock is derived from the clocks on channels A and B in a phase locked loop (PLL) 102 for timing readout from FIFOS 90, 92 (FIG. 4). Unit 94 receives clock A and clock B signals 98, 100 and chooses one or the other of them for each data block. As seen in FIG. 5, the choice is made by clock selection circuit 108 (part of FIFO control unit 94) which includes clock select logic 112 which enables the gating circuitry as appropriate depending on information derived from alarms A and B (carried along with the data signals on the communication links). Alarms A and B indicate when the respective clocks have failed, making the selection between clocks simple. If neither clock is failing, the one with the lower error rate is chosen. The PLL has a narrow bandwidth which prevents the new clock signal 214 from being affected by rapid switching transients when switching takes place. The PLL includes an oscillator that operates at twice the incoming clock frequency. The output of the PLL is halved in frequency (element 216) which allows for easy readout of data from the FIFOs.

Unit 94 (FIG. 2) also gates the data out of the FIFOs at times determined by the new clock 114. Bits read out of the FIFOs are delivered to two framers 120, 122 which are used to determine the starting points of the blocks in the two different channel bit streams. Among other things, this determines the location of the parity bits.

The framers will search a data stream for a specific frame pattern. When the frame pattern is found, all parity block boundaries in the data stream will be defined. This can be done by locking onto a special overhead frame which may be added in radio communications for the transmission of a service channel.

Figure 6:
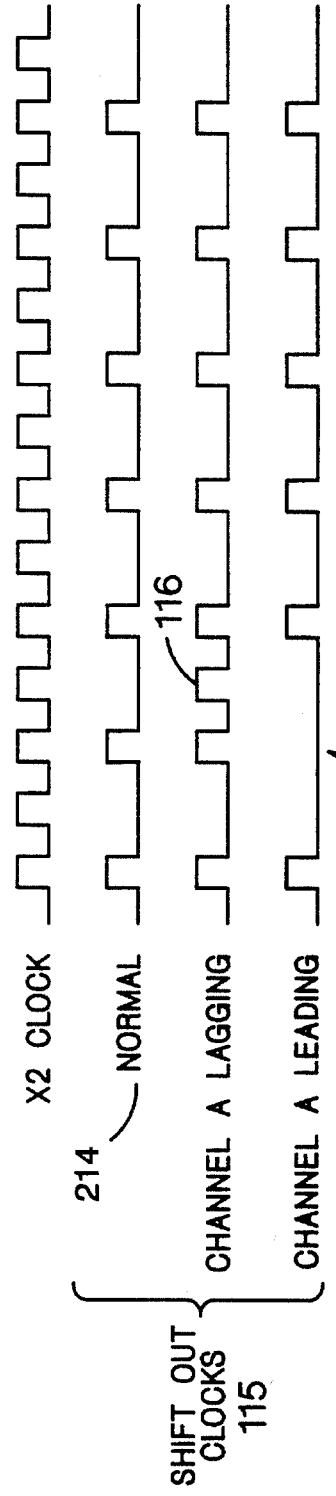
FIG. 6 is a timing diagram.

The derived frame boundary information is then sent to the control unit 94 which compares the starting points of the frames of the two channels and determines whether symbol stream A should be advanced or delayed, by an integer number of bit periods, with respect to symbol stream B. As seen in FIG. 6, if channel A is to be advanced, additional clocking signals 116 will be inserted in the channel A shift out clock 115. Similarly, if the symbol stream is to be delayed, some of the clock pulses 118 in the shifting out clock for channel A will be skipped.

The synchronization is exact, being continuous across a bit period. The dual port RAM serves as a queue, where the write clock does not have to be synchronized with the READ clock. At the read time there is no phase difference, only a possible integer multiple of bit time difference between the two bitstreams.

The bits of each block, as they are clocked out of the framers, are delivered to the n-stores 66, 68. The blocks are then held in the n-stores until the parity check of the symbols has been completed. Parity checking and other decision making operations in the switch logic circuit are accomplished in a small fraction of a bit period, so that storage of exactly n bits in the n-stores should be sufficient.

The switch control 70 decides which of the two blocks in the n-stores should be sent to the output 19, on the basis of clock and frame information 130 from the FIFO control, parity error signals 132, 134 and parity time from the two framers. The switch logic also calculates the average bit error ratio (BER) for each channel output stream over a set time period, for instance, 0.1 seconds.

The switch logic 70 includes a BER element 140 that determines the bit error ratio 142, 144, for each channel, averaged over an appropriate period and uses BER information to select a channel when both channels are experiencing errors, and to select a clock in the case of excessive errors. The logic implemented by the switch control 70 may be summarized as follows.

| block in channel output stream 95 | block in channel output stream 97 | BER | choose |
|---|---|---|---|
| no parity error | no parity error |  | current selection |
| parity error | no parity error |  | 97 |
| no parity error | parity error |  | 95 |
| parity error | parity error | BER (97) > BER (95) | 95 |
| parity error | parity error | BER (95) > BER (97) | 97 |

If both blocks of a synchronized pair are correct, no switching takes place. A parity error on a current connection requires an immediate switch if the other connection is error-free.

The output symbol stream 19 and the clock 150 are sent to a demultiplexer circuit 21, that removes the (n+1)st parity bit from the block of n bits, yielding the final stream 17 which may be used at the receiver or sent along on the next communication hop. In radio systems, and perhaps others, error checking and switching will be done in every repeater and at every terminal receiving station. This ensures that outages due to multipath fading can be effectively reduced if the second channel is connected to a separate receiving antenna (space or angle diversity) or is operated on a separate frequency (frequency diversity).

A wide variety of other embodiments are also within the scope of the following claims. For example, to locate the parity bit in a block, a framer can calculate the parity of n bits (beginning with an arbitrary bit) and compare it to the (n+1)st bit. The computation is then repeated by advancing the arbitrary starting point by one bit. In n computations or fewer, the framers will find that the parity of a block matches the (n+1)st bit. When seven blocks in a row are found to have proper parity, the framer declares that it has found the proper starting point of the blocks (frames). Other error checking schemes may be used.

What is claimed is:

1. A method for reducing bit errors in communication of a stream of digital information comprising incorporating an error checking facility in the information, sending the information on two independent communication channels, and selecting the information sent on one or the other of the two channels based on an error checking analysis of the information sent on both of the channels.

2. The method of claim 7 wherein the two channels impose different delays on the communication of the information and the method further comprises compensating for the different delays prior to the selecting step.

3. The method of claim 1 wherein the incorporating step comprises organizing the information in blocks of bits and incorporating error checking information in each of the blocks of bits.

4. The method of claim 3 wherein the selecting step comprises making a selection for each of the blocks based on an error checking analysis of the error checking information in the block.

5. The method of claim 1 further comprising repeating, for the information selected in the selecting step, the steps of incorporating, sending, and selecting.

6. The method of claim 5 wherein the incorporating step comprises adding parity checking bits to the selected information.

7. The method of claim 1 wherein the step of selecting comprises determining a relative degree of error exhibited in the information sent on the two channels.

8. The method of claim 7 wherein the step of selecting comprises selecting one of the channels for which the information is not in error.

9. The method of claim 7 wherein the step of selecting comprises determining an average error rate over time for each of the channels and selecting the channel with the lower average error rate.

10. A method for reducing bit errors in communication of a stream of digital information comprising organizing the information in blocks of bits, incorporating error correcting information in each of the blocks of bits, sending the information on two independent communication channels imposing different delays on the communication of the information, compensating for the different delays to synchronize the information sent on the two channels, selecting the synchronized information sent on one or the other of the two channels by determining a relative degree of error exhibited in the information sent on the two channels, and repeating the organizing, incorporating, sending step, compensating step, and selecting steps for the information selected in the selecting step.

11. Digital communication apparatus for reducing bit errors in communication of a stream of digital information, comprising one or more connected systems, each system having a processor incorporating an error checking facility in the information, two independent communication channels, a transmitter sending the information incorporating the error checking facility on the two independent communication channels, a receiver receiving the information sent on the two communication channels, and a controller selecting the information received on one or the other of the two channels based on an error checking analysis of the information sent on both of the channels.

12. The apparatus of claim 11 wherein the two channels impose different delays on the communication of the information and further comprising a synchronizer compensating for the different delays prior to the selection of information by the controller.

13. The apparatus of claim 11 wherein the processor incorporates the error checking facility in the information by organizing the information in blocks of bits and incorporating error correcting information in each of the blocks of bits.

14. The apparatus of claim 13 wherein the controller selects one of the channels by making a selection for each of the blocks based on an error checking analysis of the error correcting information in the block.

15. The apparatus of claim 11 wherein the controller in a first system is connected to a processor in a second system, said processor incorporating an error checking facility in the information selected by the controller.

16. The apparatus of claim 15 wherein the processor adds parity checking bits.

17. The apparatus of claim 11 wherein the controller selects one of the channels by determining a relative degree of error exhibited in the information sent on the two channels.

18. The apparatus of claim 17 wherein the controller selects one of the channels for which the information is not in error.

19. The apparatus of claim 17 wherein the controller selects one of the channels by determining an average error rate over time for each of the channels and selects the channel with the lower average error rate.

20. Digital communication apparatus for reducing bit errors in communication of a stream of digital information, comprising two or more connected systems, each system having a processor organizing the information in blocks of bits and incorporating error correcting information in each of the blocks of bits, two independent communication channels imposing different delays on the communication of the information, a transmitter sending the information incorporating the error checking facility on the two independent communication channels, a receiver receiving the information sent on the two communication channels, a synchronizer compensating for the different delays imposed by the two channels, and a controller selecting the synchronized information received on one or the other of the two channels by determining a relative degree of error exhibited in the information sent on the two channels, wherein the processor in a first system is connected to a controller in a second system, said processor incorporating an error checking facility in the information selected by the controller.

* * * * *